Patented Mar. 4, 1947

2,417,017

UNITED STATES PATENT OFFICE 2,417,017

PROCESS FOR THE MANUFACTURE OF UNSATURATED LACTONES OF THE CYCLOPENTANOPOLYHYDROPHENANTHRENE SERIES

Leopold Ruzicka, Zurich, Switzerland, assignor to Ciba Pharmaceutical Products, Inc., Summit, N. J., a corporation No Drawing. Application May 20, 1942, Serial No. 443,840. In Switzerland July 11, 1941

5 Claims. (Cl. 260—239.5)

The cardio-active substances, both of the digitalis and strophanthus series and of the squill and toad-poison group, are unsaturated lactones of the cyclopentanopolyhydrophenanthrene series.

It has now been found that similar unsaturated lactones of the cyclopentanopolyhydrophenanthrene series can be obtained, if lactones of this series which are saturated in the lactone ring and contain a substituent X in the α-, γ- or δ-position to the carbonyl of the lactone group, or on the carbon atom to which the lactone group is attached, are treated with agents which cause elimination of HX, X representing a free hydroxyl group, a group which upon hydrolysis is converted into a hydroxyl group, a thiol group or an amino group.

The lactones used as starting materials may be saturated or unsaturated in the cyclopentanopolyhydrophenanthrene radical, be substituted anywhere and be of any configuration. The radical mentioned may further be attached directly to a carbon atom of the lactone ring or may be connected to same through a branched or unbranched aliphatic chain. The lactone ring may have, apart from the substituent containing the steroid nucleus and possibly the substituent X, one or more alkyl or aryl groups.

The following may be given as examples of the substituent X, which is to be eliminated: free, esterified or etherified hydroxyl groups, and, more particularly, halogen or pseudo-halogen atoms, amino groups, free or substituted by alkyl, aryl or other radicals, and free or substituted thiol groups. The substituents to be eliminated can be for example in the α-, γ- or δ-position to the carbonyl of the lactone grouping, either in the lactone ring itself, on the carbon atom of the steroid structure which bears this ring or in a chain connecting the two ring systems.

Suitable starting products are obtained, for example, by bromination of the corresponding saturated lactone e. g. the Δ5-3-acetoxy-17-hydroxy-norcholenic acid lactone or its hydrogenation product, whereby the bromide atom obviously enters the α-position to the carbonyl group. Other starting products may be obtained, for example, from oxide such as vinyl androstane oxide, etc. which can be easily obtained in the known way from vinyl-androstenediol, allyl-androstenediol and similar compounds. If these oxides are caused to react with malonic ester or substituted malonic esters and analogous compounds such as cyanoacetic acid, saturated hydroxy-lactones are obtained after decarboxylation which can be converted by the present process into unsaturated lactones. These hydroxy-lactones correspond to the following formulas:

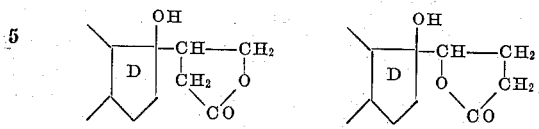

It is also possible to start with, for example, 3-hydroxy-pregnane-21-al and similar aldehydes from which by condensation with glyoxylic acid and reduction of the aldehyde group to a hydroxyl group, α-hydroxy lactones of the following formula are obtained:

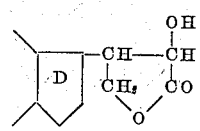

The elimination of the hydroxyl or substituted hydroxyl group is best carried out by known methods such as, for example, the action of acids, acid salts or substances which lower the surface tension, if necessary at increased temperature and with simultaneous distillation or sublimation. In a similar known way free and substituted thiol and amino groups are eliminated. The last named groups can be removed, for example, by conversion to quaternary ammonium bases and treatment with alkalies. Alkaline media, particularly tertiary amines also serve to remove the hydrogen halide from the halogenized lactones; the other known methods may, however, also be utilized.

The unsaturated lactones obtained as end-products are identical with the natural cardio-active genins or have a similar structure.

*Example 1*

From the compound $C_{25}H_{36}O_4$, which is presumably a 3-acetoxy-17-hydroxy-norcholenic acid lactone (see Miescher & Fischer, Helv. Chim. Acta. vol. 22, p. 157 [1939]), a bromo-lactone is prepared by the action of 2 mols. bromine and subsequent elimination of the bromine atoms in the 5,6-position e. g. by means of alkali iodide in acetone. 3 gr. of this starting product are boiled with 20 gr. diethyl-aniline until the hydrogen bromide is completely eliminated. The reaction mixture is then poured into water, extracted with ether and shaken up with acid. The ether solution is evaporated down, the crude product purified first by acetylation with acetic anhydride and pyridine and then by chromatography over aluminimum oxide. On washing, the majority is found in the benzene-ether fraction and can be further purified by recrystallisation from alcohol. The compound presumably has the constitution of a $\Delta^{5:6:20:22}$-3-acetoxy-17-hydroxy-norcholadienic acid lactone.

The same unsaturated lactone is obtained if the bromo-lactone is first converted to an aminolactone with amines, and the amino group then eliminated by heating or treating with acids. The corresponding thiol-lactone (prepared by treating the bromo-lactone mentioned above with sodium hydrosulphide) can also be used instead of the amino-lactone.

Example 2

$\gamma'$[$\Delta^5$-3-hydroxy-etio-cholenyl-(17)]-$\gamma'$-oxo-n-butyric acid of the formula:

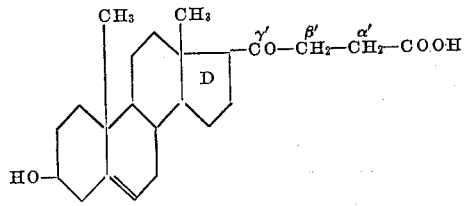

(obtained by the action of malonic ester on 21-bromo-pregnene-3-ol-20-one, saponification and decarboxylation) is converted with acetic anhydride and a trace of acetyl chloride into $\gamma'$-[$\Delta^5$-3-acetoxy-etio-cholenyl-(17)]-$\gamma'$-acetoxy-butyrolactone of the formula:

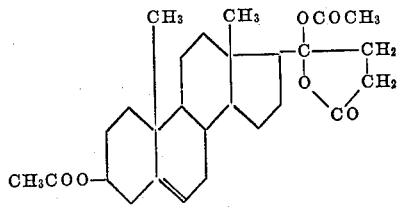

5 gr. of this substituted $\gamma$-hydroxy-lactone are distilled in a high vacuum. A mixture of $\gamma'$-[$\Delta^5$-3-acetoxy-etio-cholenyl-(17)]-$\Delta^{\beta':\gamma'}$-butenolide and $\gamma'$-[$\Delta^5$-3-acetoxy-etio-cholenyl-(17)]-$\Delta^{\alpha':\beta'}$-butenolide, having the following formulas, is obtained with elimination of acetic acid:

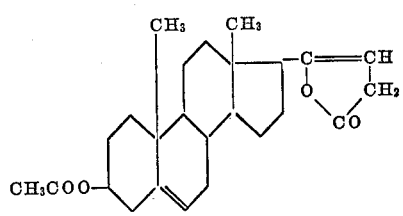

and

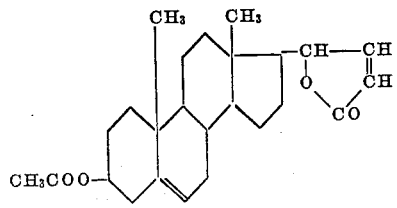

The two unsaturated lactones can be separated by the usual methods, e. g. by chromatography. By heating in the presence of catalysts e. g. piperidine, the $\beta':\gamma'$-lactone can be converted into the $\alpha':\beta'$-lactone.

The same lactones may be obtained from $\gamma'$-[$\Delta^5$-3-acetoxy-etio-cholenyl-(17)]-$\gamma'$-chlor-butyro-lactone (obtainable as above with the use of acetyl chloride alone).

If one starts with $\gamma'$-[$\Delta^5$-3-acetoxy-etio-cholenyl-(17)]-$\gamma'$-chlor-$\alpha'$-methyl-butyro-lactone (obtained as above, but using methyl malonic ester instead of malonic ester) $\gamma'$-[$\Delta^5$-3-acetoxy-etio-cholenyl-(17)]-$\alpha'$-methyl-$\Delta^{\beta':\gamma'}$-butenolide is obtained in addition to the corresponding $\Delta^{\alpha':\beta'}$-lactone.

Example 3

$\delta'$-[$\Delta^5$-3-hydroxy-etio-cholenyl-(17)]-$\delta'$-oxo-n-valerianic acid (obtained by the action of propiolic acid ester on 21-bromo-pregnene-3-ol-20-one, hydrogenation of the acetylene linkage and saponification) are converted, by heating with acetyl chloride into $\delta'$-[$\Delta^5$-3-acetoxy-etio-cholenyl-(17)]-$\delta'$-chlor-$\delta$-pentanolide of the following formula:

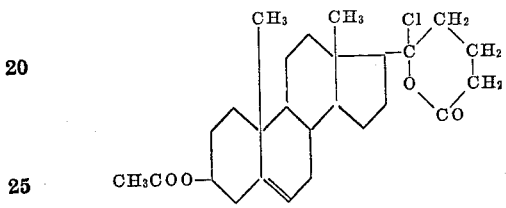

2 gr. of this chloro-lactone are boiled for a short time with 5 gr. pyridine. The reaction mixture is poured into water, the substance extracted with ether and washed with dilute acetic acid. The substance is purified by sublimation in a high vacuum. The product is $\delta'$-[$\Delta^5$-3-acetoxy-etio-cholenyl-(17)]-$\delta':\gamma'$-pentenolide of the formula:

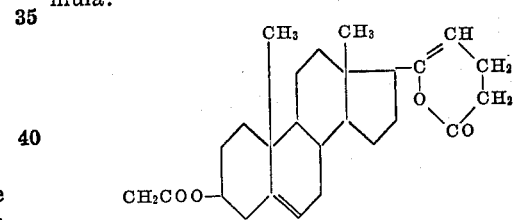

If $\delta'$-[$\Delta^5$-3-acetoxy-etio-cholenyl-(17)]-$\delta'$-chloro-$\Delta^{\alpha':\beta'}$-pentanolide (obtained as above after partial hydrogenation of the acetylene linkage) is treated in a similar way, $\delta'$-[$\Delta^5$-3-acetoxy-etio-cholenyl-(17)]-pentadieneolide is obtained as end-product. It has the following formula:

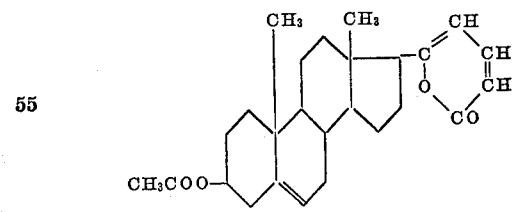

The lactones described can be converted by hydrolysis into the corresponding 3-hydroxy compounds.

What I claim is:

1. A lactone of the group consisting of the saturated and unsaturated five- and six-membered lactones which are substituted at the $\omega$-carbon atom by a $\Delta^5$-3-acyloxy-etio-cholenyl-(17) radical.

2. A $\gamma'$-[$\Delta^5$-3-acetoxy-etio-cholenyl-(17)]-$\Delta^x$-butenolide, $x$ representing one of the positions $\alpha':\beta'$ and $\beta':\gamma'$ of the lactone ring.

3. A $\gamma'$-[$\Delta^5$-3-acetoxy-etio-cholenyl-(17)]-$\alpha'$-methyl-$\Delta^x$-butenolide, $x$ representing one of the positions $\alpha':\beta'$ and $\beta':\gamma'$ of the lactone ring.

4. The $\delta'$-[$\Delta^5$-3-acetoxy-etio-cholenyl-(17)]-$\delta':\gamma'$-pentenolide of the formula

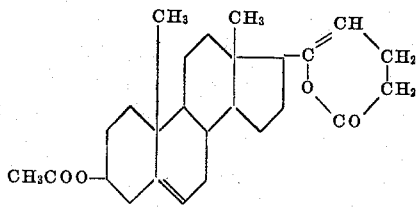

5. The $\delta'$-[$\Delta^5$-3-acetoxy-etio-cholenyl-(17)]-pentadieneolide of the formula

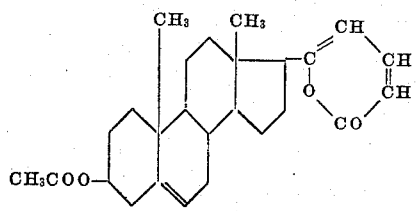

LEOPOLD RUZICKA.

REFERENCES CITED

The following references are of record in the file of this patent:

UNITED STATES PATENTS

| Number | Name | Date |
|---|---|---|
| 2,265,165 | Hopff et al. | Dec. 9, 1941 |
| 2,359,096 | Elderfield | Sept. 26, 1944 |
| 2,153,700 | Serini | Apr. 11, 1939 |
| 2,247,822 | Schwenk | July 1, 1941 |
| 2,249,911 | Oppenauer | July 22, 1941 |
| 2,188,330 | Bockmuhl | Jan. 30, 1940 |
| 2,184,299 | Hildebrandt | Dec. 26, 1939 |

OTHER REFERENCES

Fieser, Chemistry of Natural Products Related to Phenanthrene (1936), pp. 262-269—312-313.

Linville and Elderfield, Journal Organic Chemistry, 1941, pp. 270-272.

Helvetica Chimica Acta, vol. XXIV, Feb. 1, 1941, pp. 76-82.